United States Patent [19]

Mochizuki

[11] 4,158,448

[45] Jun. 19, 1979

[54] AIRPLANE WITH PIVOTABLE WING

[76] Inventor: Matsuji Mochizuki, No. 3391-1, Muramatsu, Shimizu-shi, Shizuoka Prefecture 424, Japan

[21] Appl. No.: 856,430

[22] Filed: Dec. 1, 1977

Related U.S. Application Data

[63] Continuation of Ser. No. 741,445, Nov. 12, 1976, abandoned.

[30] Foreign Application Priority Data

Sep. 14, 1976 [JP] Japan .................................. 51-110190

[51] Int. Cl.² ............................................. B64C 3/00
[52] U.S. Cl. ........................................ 244/13; 244/16; 244/49; 244/DIG. 1
[58] Field of Search ...................... 244/11, 13, 16, 38, 244/48, 49, 153 R, 154, DIG. 1

[56] References Cited

U.S. PATENT DOCUMENTS

| | | | |
|---|---|---|---|
| 1,464,356 | 8/1923 | Fedoryszak | 244/11 |
| 2,434,077 | 1/1948 | Lang | 244/153 R |
| 3,135,483 | 6/1964 | Girard | 244/DIG. 1 |
| 3,140,842 | 7/1964 | Craigo et al. | 244/DIG. 1 |
| 3,306,559 | 2/1967 | Girard | 244/DIG. 1 |
| 3,813,060 | 5/1974 | Mochizuki | 244/DIG. 1 |

Primary Examiner—Charles E. Frankfort
Attorney, Agent, or Firm—Frank J. Jordan

[57] ABSTRACT

An airplane includes a wing having the configuration of an equilateral triangle and covered with a flexible membrane which is provided with free trailing edges. The wing is secured by pivot brackets to the top of supports placed at the center of gravity of the airplane body as to pivot right and left alternatively to obtain a self-balancing of flight like the action of a flying kite, such that it is safe and easy to control the airplane during takeoff, landing and sustained flight while increasing the lifting force.

1 Claim, 5 Drawing Figures

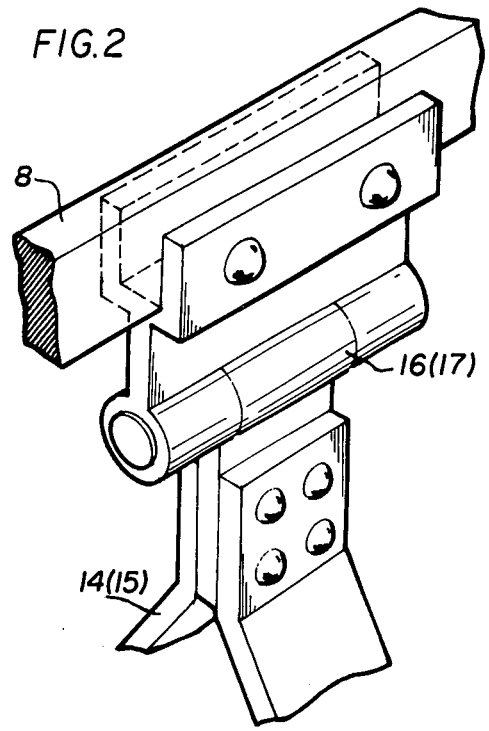
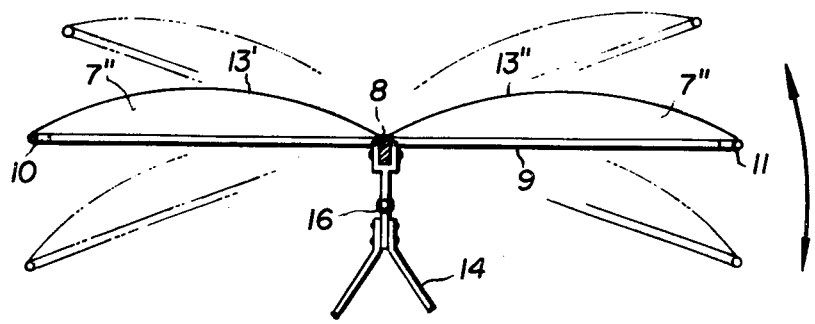

AIRPLANE WITH PIVOTABLE WING

This is a continuation of application Ser. No. 741,445, filed Nov. 12, 1976, and now abandoned.

BACKGROUND OF THE INVENTION

The invention relates to an airplane which is particularly capable of obtaining a self-balancing by a main wing which fluctuates just like a flying kite and which provides for safety of takeoff and landing as well as an increase in lift in flight. A related disclosure is U.S. Pat. No. 3,813,060 issued May 28, 1974 to Matsuji Mochizuki.

It is known that in kite flying in the air with two lines attached to a kite, the latter obtains lift by safely oscillating in the airstream. In order to make the wing of an airplane to work similar to the action of a kite, it is necessary to make it capable of oscillating relative to the airplane body without being rigidly fixed to each other, otherwise, the safety is impaired and there is a danger of turnover.

The present invention is characterized in that, in order to solve the above-mentioned problems in attaching to an airplane a wing operating like the action of a kite, a pair of V-shaped supports are provided with reinforcing frames at both sides at about the center of gravity of the airplane body, the latter having an engine-driving propellor in front of the body, a pilot's seat positioned at about the center of gravity of the body, and a rudder and stabilizer at the rear of the body. Wing side frames are connected at the middle part to both ends of a crossbeam fixed intersectingly on a keel of the wing or on the outer end of a pair of movable crossbeams, of which the inside end is fixed within a box-type metal part at both sides of the keel for pivotally moving of the crossbeams relative to the keel. The wing is covered with a flexible membrane of equilateral triangular shape secured on the keel and the side frames to form a pair of free trailing edges to be inflated at both sides of the keel and which is connected movably with hinges at the front of the supports so as to roll obliquely at each side of the keel alternatively or to oscillate the half side parts of the wing independently of each other while keeping the tip end of the wing positioned above the forepart of the airplane body.

BRIEF DESCRIPTION OF THE DRAWINGS

FIG. 2 is an enlarged perspective view in detail of the hinge device including the keel and the supports;

FIG. 3 is a front view of the wing; and

DESCRIPTION OF THE PREFERRED EMBODIMENTS

Figure 1:
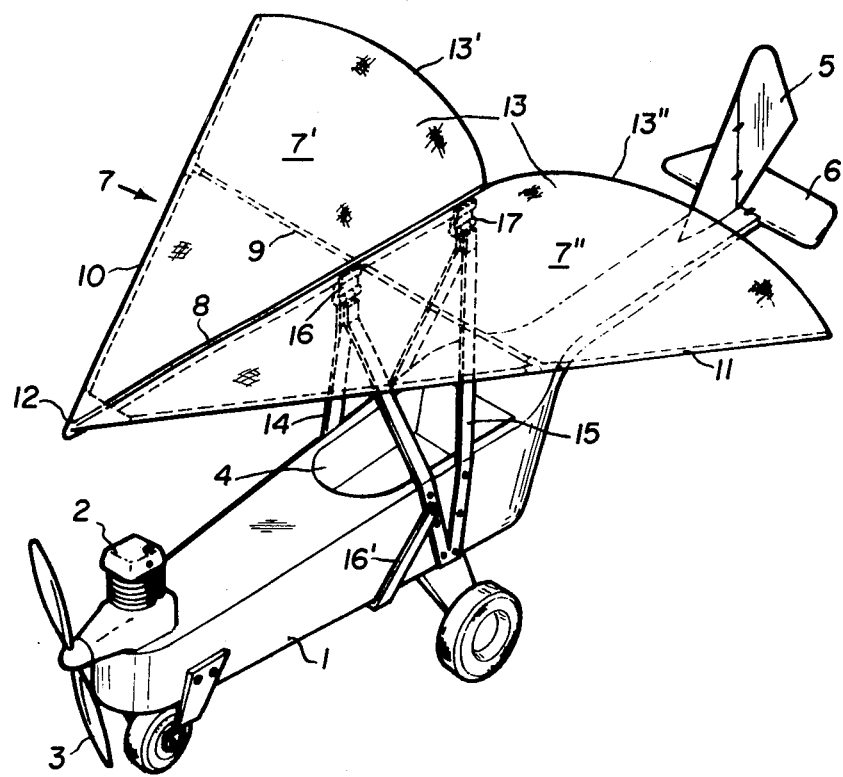
FIG. 1 is a diagrammatic perspective view of an airplane according to one embodiment of the invention.

The airplane according to the invention as shown in FIGS. 1 to 3 is provided with an engine 2 to drive a propeller 3 in front of a body 1, a pilot's seat 4 located at about the center of gravity of the body 1, and a rudder 5 and stabilizer 6 at the rear end of the body.

Wing side frames 10, 11 are connected at their midpoints with the outer ends of a crossbeam 9 which is secured at its inner ends to the opposed sides of a keel 8. The wing frames 10, 11 are joined at their forward ends with the forward end of the keel 8, and a wing sheet or a flexible membrane 13 of equilateral triangular shape is spreaded and secured on the keel 8 and frames 10, 11. The wing 7 is of kite-like shape and has a pair of trailing edges 13', 13" to be inflated by the passing airstream as the latter expands the wing 7 at both sides of the keel 8.

A pair of V-shaped supports 14, 15 as viewed from a side are mounted at both sides of the body 1 and are disposed at about the center of gravity of the body and reinforced with a frame 16' fixed obliquely forward of the supports 14, 15 at both sides of the body 1. The wing supported by means of hinges 16, 17 is mounted on the top of the support 14, 15, has a tip end 12 joined with the forward ends of keel 8 and frames 10, 11, which always projects above the forward part of the body 1, and inclines to one side of the body 1 on the ground as well as to either the left and right sides by the rushing air in flight.

The rudder 5, the stabilizer 6 and the wing 7 may be placed suitably without interfering with each other.

The airplane according to the invention is driven with a forward motion by the engine-driving propellor 3. The wing 7 being of a kite-type, inclines by itself at the side of the body 1 while on the ground, and in flight inflates both side parts 7', 7" of the wing 7 of flexible membrane independently due to the onrushing air. The wing changes its disposition to be balanced naturally by means of hinges 16, 17 on the top of the supports 14, 15. The airplane increases the lifting force by the rolling wing as to take off from the ground in a short running distance, and its flight conditions may be adjusted on the one hand with the forward motion by the propeller 3 and the rudder 5 and stabilizer 6 by an operator's control, and on the other hand, by the angle of incidence as well as the rolling wing 7 for self-balancing in the airstream the center of gravity of the body 1.

The rolling action or alternative oscillation of the wing 7 with the side part 7', 7" may decrease the amount of vibration of the body 1 under gravity as to promote the safety and efficiency and obtain an increase in the lift while in the air.

As the airplane according to the invention takes off, flies and lands under safe conditions without the pilot having to master controlling the function of the kite-like flying by the main wing, it may serve in such various operations as dropping agricultural chemicals, hanging a rope over a valley as well as sports and climate observation.

Figure 4:
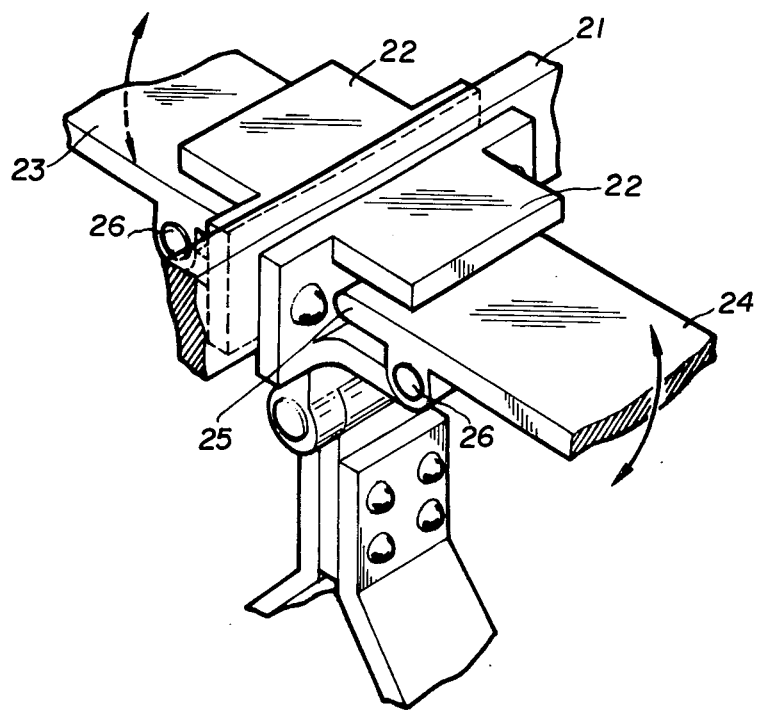
FIGS. 4 and 5 are views of a variation of the embodiment according to the invention.
Figure 5:
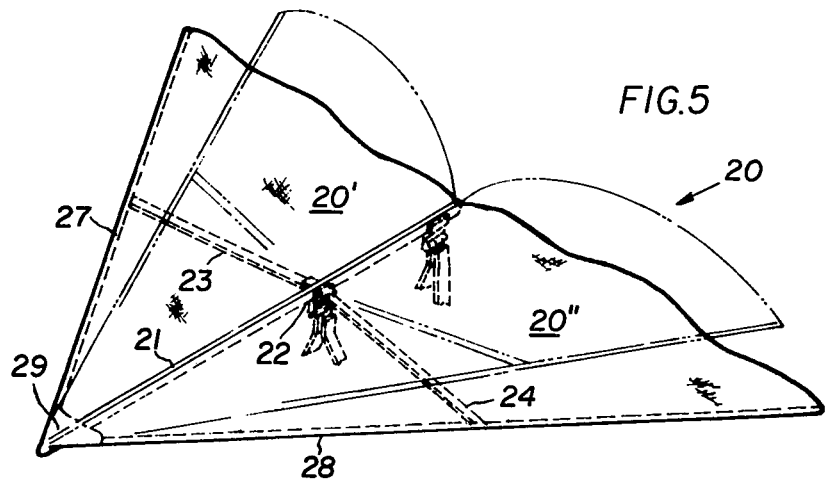

In the alternative embodiment according to the invention as shown in FIGS. 4 and 5, the airplane body and supports are similar to the previous embodiment as already explained. However, in the embodiment there is provided a box-type metal part 22 fixed on both sides of a keel 21 of a wing 20. A pair of crossbeams 23, 24 have ends 25 and are pivoted fluctuatingly at 26. The respective ends of both wing-side frames 27, 28 and the keel 21 are joined movable altogether to form a tip end 29 of the wing 20.

In this embodiment, the respective side wing-parts 20', 20" of the wing 20 oscillate independently of each other at both sides of the keel 21 by means of the crossbeams 23, 24 and the movable tip 29, so that the airplane, when on the ground, has the wing parts 20', 20" settled or slanted downwardly just like feathers of a moth, as to keep the airplane from turning over and the breakdown of the wing by the wind. In flight the side wing-parts 20', 20" raise simultaneously or independently just like the wings of a pigeon to obtain a self-balancing of flight for the stabilization as well as an increase of lift efficiency.

I claim:

1. A pivotal winged airplane comprising an airplane body, a pair of spaced wing support means secured fixedly to and extending upwardly from said airplane body, each of said wing support means comprising a generally inverted V-shaped support member extending upwardly from said airplane body, said inverted V-shaped support members being joined to one another in a generally V-shaped configuration, a wing comprising a wing frame and a sheet of flexible material secured to the wing frame, said wing frame including a longitudinally extending central keel means having a longitudinal axis generally bisecting the wing, said wing frame having the configuration of an equilateral triangle having an apex, said wing frame being disposed to have said apex located forwardly of the airplane body, said longitudinally extending keel means passing generally through said apex, said wing frame further comprising side frame support members extending rearwardly from said apex in a generally V-shaped configuration, said flexible sheet material being secured to said side frame support members and to said keel means and having a free trailing edge, said wing frame being provided with a pair of cross members, each of said cross members extending generally perpendicular to the axis of said central keel means from opposed sides thereof, a pair of brackets secured to opposite sides of said central keel means, each of said brackets having spaced parallel parts extending transversely of the axis of said central keel means, one of said parallel parts of each of said brackets having first pivot means for separately and independently supporting each of said cross members about parallel axes disposed on opposite sides of said keel means, each of said cross members having terminating end portions secured to said side frame support members, whereby each half of the wing frame on either side of said keel means is separately and independently pivotal about said spaced parallel axes, the other of said parallel parts of said brackets being disposed to engage the respective cross member to provide a stop means for limiting the pivotal movement of each cross member, second pivotal means on each of said wing support means for pivotably mounting said central keel means for rotation about a pivotal axis parallel to the longitudinal axis of said central keel means, said central keel means being supported by said second pivotal means in overlying relationship to the longitudinal axis of the airplane body, said second pivotal means on each of said wing support means being spaced from one another and defining a pivotal axis fixedly disposed parallel to the longitudinal axis of the airplane body, said sheet of flexible material being inflatable under flight conditions of the airplane, an engine driving a propeller on the forward part of said airplane body and a rudder and stabilizer at the rear part of said airplane body, said airplane being driven with a forward motion by said propeller and being controlled in flight by said propeller, said rudder and said stabilizer, said wing being free of controls and being freely pivotal about said first and second pivotal means under flight conditions such that aerodynamic forces on said wing freely pivot said wing.

* * * * *